Jan. 30, 1968   A. G. NYGAARD   3,366,295
CAR LUGGAGE CARRIER
Filed Feb. 3, 1966   2 Sheets-Sheet 1

Andrew G. Nygaard
INVENTOR.

BY Clarence A. O'Brien
and Harvey B. Jacobson
Attorneys

Jan. 30, 1968   A. G. NYGAARD   3,366,295
CAR LUGGAGE CARRIER
Filed Feb. 3, 1966   2 Sheets-Sheet 2
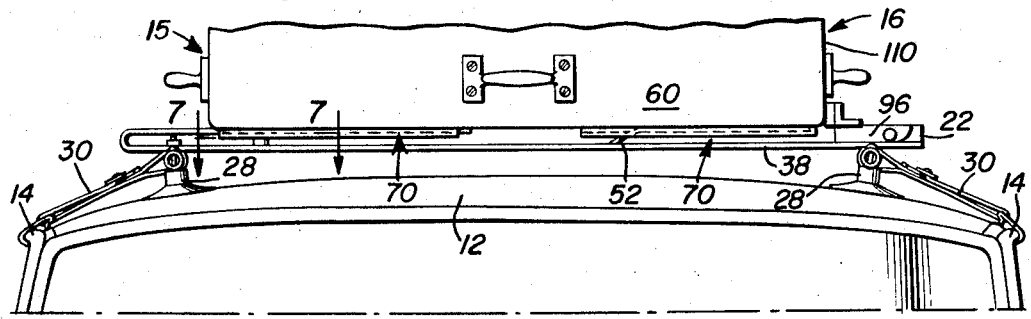
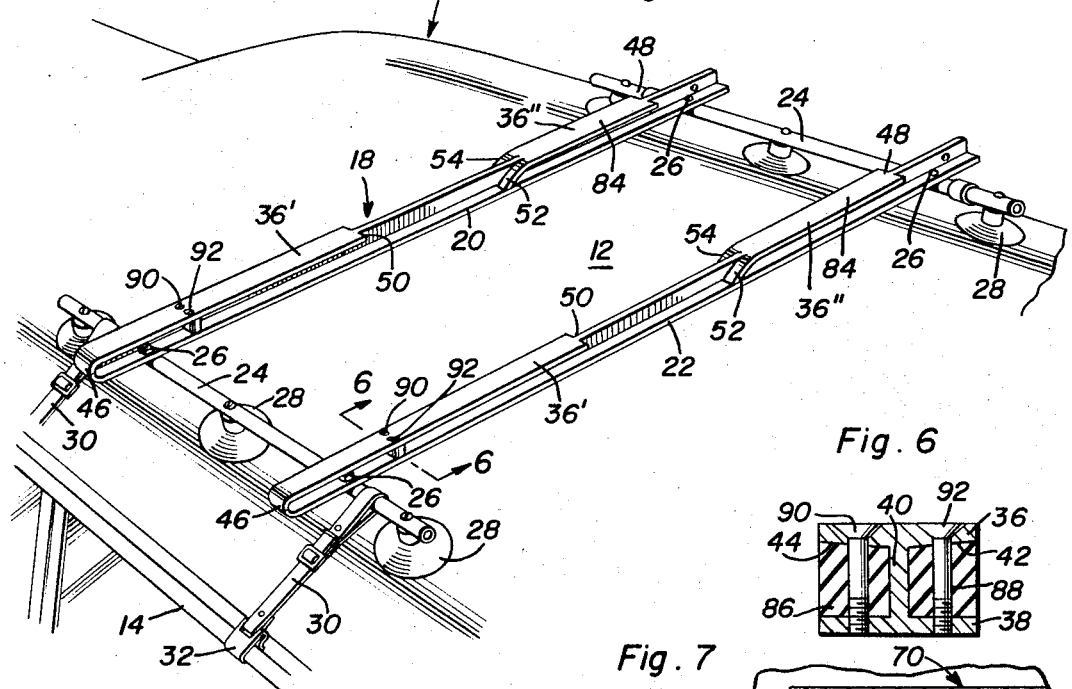
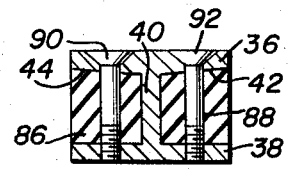
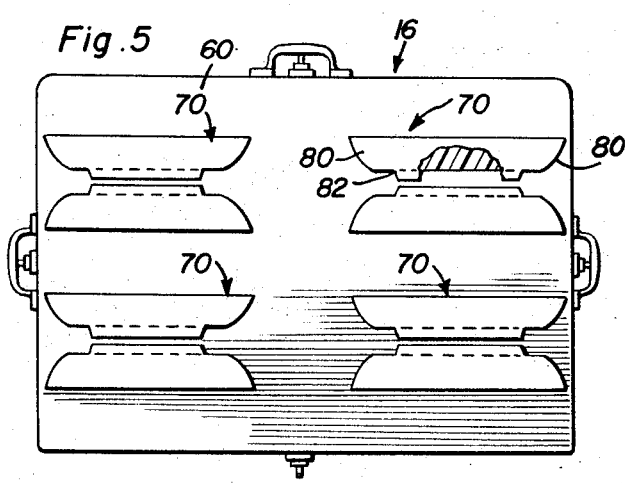
Andrew G. Nygaard
INVENTOR.
BY Clarence A. O'Brien
and Harvey B. Jacobson
Attorneys United States Patent Office 3,366,295
Patented Jan. 30, 1968

3,366,295
CAR LUGGAGE CARRIER
Andrew G. Nygaard, P.O. Box 2001,
Rapid City, S. Dak. 57701
Filed Feb. 3, 1966, Ser. No. 524,941
8 Claims. (Cl. 224—42.1)

This invention relates to a novel and useful car top carrier and more specifically to a support frame adapted to be supported from the rear of a passenger vehicle and a storage area defining housing releasably securable to the support frame.

The housing and support frame include coacting structural features which mount the housing on the frame for reciprocal movement relative thereto between a first position anchored to the support frame and a second position projecting at least slightly outwardly of one side of the associated vehicle and from which said housing is readily disengageable from the support frame.

Although any form of storage area defining housing can be utilized in the instant invention, the storage area defining housing specifically illustrated and described herein comprises a sectional housing member including an upwardly opening bottom, a downwardly opening top, and at least one upwardly opening center section which may be releasably secured between the top and bottom of the housing or which may be removed from between the top and the bottom of the housing so that the top of the housing may be directly secured to the bottom thereof.

The main object of this invention is to provide a car top carrier including a support frame adapted to be removably secured to the top of an associated vehicle and a storage area defining housing readily releasably engageable with the support frame.

Yet another object of this invention is to provide a car top carrier in accordance with the preceding objects and including means whereby the storage defining housing is supported from the support frame for reciprocal movement relative thereto between a first position securedly fastened to the support frame and a second position from which the housing may be readily disengaged from the frame and in which the housing is adapted to project at least slightly from one side of the associated vehicle.

A still further object of this invention is to provide a car top carrier in accordance with the preceding objects and whose storage area defining housing includes at least two sections selectively and simultaneously removably supported from the bottom section of the housing.

A final object of this invention to be specifically enumerated herein is to provide a car top carrier in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary front elevational view of the assemblage illustrated in FIGURE 1;

FIGURE 4 is a fragmentary enlarged perspective view of the top portion of the vehicle illustrated in FIGURE 1 but with the storage area defining housing of the instant invention removed from its supporting frame;

FIGURE 5 is a bottom plan view of the storage area defining housing;

FIGURE 6 is an enlarged fragmentary vertical sectional view taken substantially upon a plane indicated by the section line 6—6 of FIGURE 4;

FIGURE 7 is an enlarged fragmentary horizontal sectional view taken substantially upon the plane indicated by the section line 7—7 of FIGURE 3.

Figure 1:
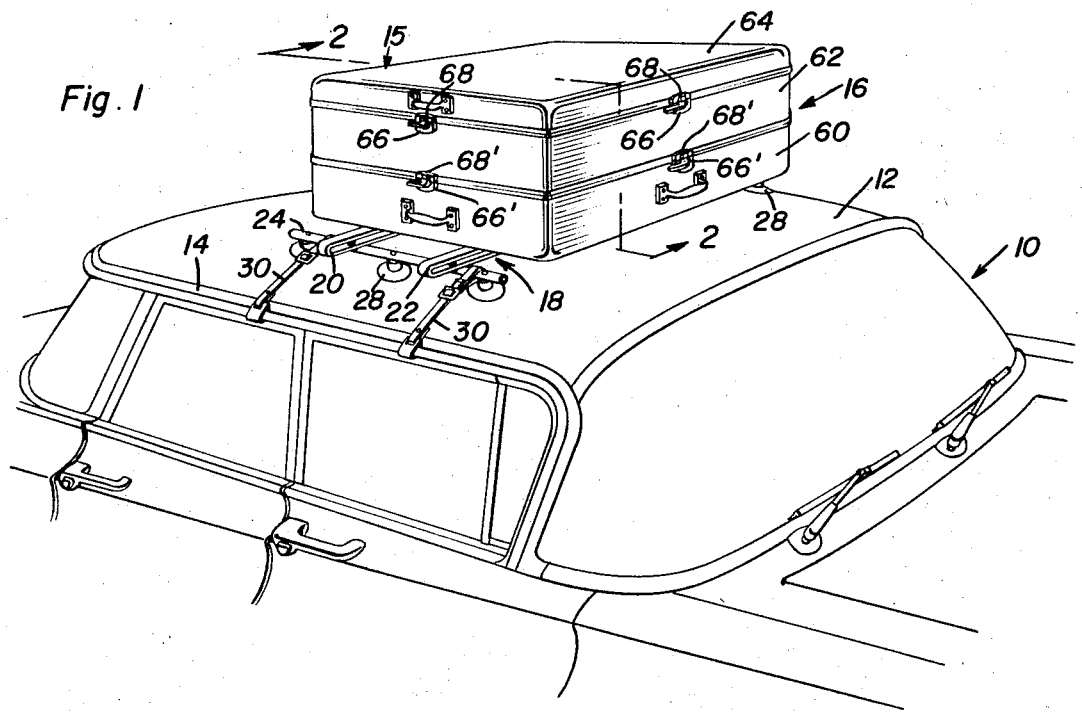
FIGURE 1 is a fragmentary perspective view of a conventional form of passenger vehicle shown with the car top carrier of the instant invention operatively mounted thereon.

Referring now more specifically to the drawings the numeral 10 generally designates a conventional form of passenger motor vehicle including a top 12 with rain gutters 14 extending along opposite marginal edge portions thereof.

The car top carrier of the instant invention is generally referred to by the reference numeral 15 and includes a housing 16 and a support frame generally referred to by the reference numeral 18 and best illustrated in FIGURE 4.

The frame 18 includes a pair of elongated guide members 20 and 22 which are substantially identical in construction and which are secured to and interconnect corresponding opposite end portions of a pair of elongated and generally parallel support members 24. The guide members 20 and 22 are secured to the support members 24 by means of suitable fasteners 26 and each of the support members 24 has dependingly supported therefrom a plurality of suction cup foot members 28 which are supported from the roof 12 of the vehicle 10. In addition, each of the support members 24 includes a pair of adjustable strap members 30 connected at one pair of corresponding ends to the opposite ends of the corresponding support member and provided with clips 32 on the other pair of corresponding ends releasably engaged with the associated rain gutter 14. In this manner, the support frame 18 is releasably secured to the top 12 in a manner such that the frame 18 is stationarily positioned on and secured to the top 12.

Each of the guide members 20 and 22 is in the form of an I-beam including upper and lower generally horizontal flanges 36 and 38, respectively, interconnected by means of an upstanding center flange or web 40. It will be noted from FIGURE 6 of the drawings that the undersurface portions of the opposite sides of the flanges 36 denoted by the reference numerals 42 and 44 are slightly upwardly convergent. Further, at one pair of corresponding ends of the guide members 20 and 22 the center flange or web 40 has been cut away and corresponding end portions of the flanges 36 and 38 are curved smoothly toward each other and disposed in end abutting relation as at 46. Further, the flange 36 is eliminated at the terminal end portions of the guide members 20 and 22 remote from the abutted ends 46 as at 48 and the opposite side portions of the flanges 36 are cut away at their midportions as at 50 defining opposite end sections 36′ and 36″ of the flange 36 on opposite ends of each of the guide members 20 and 22. Further, the opposite side portions of each of the flange sections 36″ adjacent the flange sections 36′ include free end portions 52 and 54 which are free from securement to the web 40 and curved downwardly into abutting engagement with the upper surfaces of the adjacent portions of the corresponding flanges 38, the end portions 52 and 54 defining cam surfaces or ramps whose purpose is to be hereinafter more fully set forth.

Figure 2:
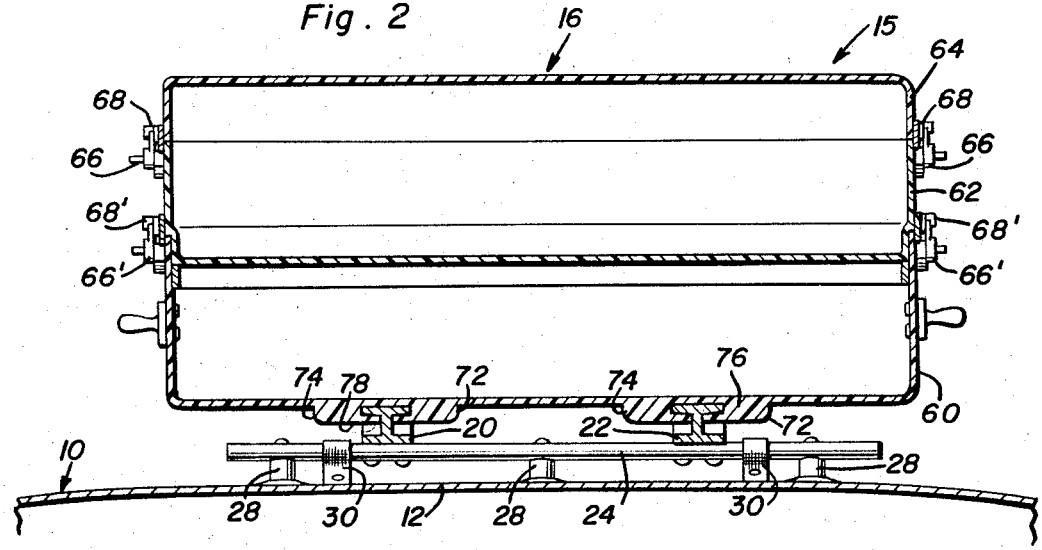
FIGURE 2 is an enlarged fragmentary vertical sectional view taken substantially upon the plane indicated by the section line 2—2 of FIGURE 1.

With attention now invited more specifically to FIGURES 2, 5 and 7 of the drawings it may be seen that the housing 16 includes an upwardly opening bottom section 60, an upwardly opening center section 62, and a downwardly opening top section 64. The top section 64 may be removably secured over the open upper end of the center section 62 by means of coacting latch means 66 and 68 carried by the sections 62 and 64 and releasably engaged with each other. Further, the sections 60 and 62 include coacting latch means 66' and 68' corresponding to the latch means 66 and 68 and releasably securing the center section 62 to the bottom section 60. Further, if it is desired, the center section 62 may be removed and the top section may be secured to the bottom section 60 by releasably engaging the latch means 66' with the latch means 68.

The bottom section 60 includes two pairs of depending way structures generally referred to by the reference numerals 70. Each structure includes a pair of generally depending projections 72 and 74 which open toward each other and define therebetween a way in which to receive the T-shaped upper portion of the corresponding guide member.

Each of the projections 72 and 74 includes a depending shoulder 76 and a laterally projecting horizontal flange 78. Further, it may be seen from FIGURES 5 and 7 of the drawings that each of the shoulders 76 includes opposite end edge portions which are curved as at 80 and that the corresponding ends of the shoulders 76 and flanges 78 define notches 82.

The central cutaway portions of the flange 36 defining the spacing between corresponding flange sections 36' and 36" is of a length to receive the notched opposing edge portions of the corresponding flanges 78. Accordingly, the upper surface portions 84 of the flange sections 36' may be received between each pair of aligned ways 70 with the housing 16 projecting slightly outwardly of the ends of the guide members 20 and 22 remote from the abutted ends 46 of the flanges 36 and 38. Then, the housing 16 may be slid toward the resilient abutments 86 and 88 secured between the flanges 36 and 38 of each guide member 20 and 22 by means of fasteners 90 and 92 until such time as the notched portions 82 of the flanges 78 adjacent the abutments 86 and 88 abut the latter. Of course, such movement of the housing 16 along the guide members 22 will cause the flange sections 36' to be slid into one pair of transversely aligned ways 70 and the flange sections 36' to be slide into one pair of transversely aligned ways 70 and the flange sections 36" to be slid into the other pair of transversely aligned ways 70.

Figure 8:
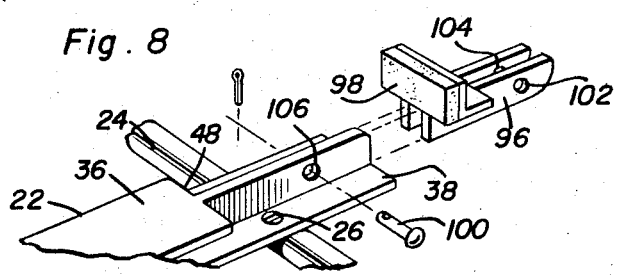
FIGURE 8 is a fragmentary exploded perspective view of one end portion of one of the guide members of the support frame illustrating the manner in which a removable abutment member may be secured thereto.

Then, with attention now directed more specifically to FIGURES 3 and 8 of the drawings, the removable abutment members 96 including resilient pads 98 may be removably secured to the end portions of the webs 40 remote from the abutment members 86 and 88 by means of a removable fastener 100 passed through the aligned apertures 102 and 104 formed in each abutment member and the aperture 106 formed through the corresponding web 40. It is of course to be noted that when the housing 16 is positioned as illustrated in FIGURE 3 of the drawings the resilient abutment members 86 and 88 are slightly compressed by the notched portions 82 of the corresponding ways 70 and the resilient pad 98 is also slightly compressed and engaged with the side 110 of the bottom section 60 remote from the abutment members 86 and 88.

When it is desired to remove the housing 16 from the guide members 20 and 22, it is merely necessary to remove the abutment members 96 by withdrawing their attaching pins or fasteners 100 whereupon the housing 16 may then be pulled to the right as viewed in FIGURE 3 of the drawings until such time as the pair of ways 70 on the left hand side of the housing 16 illustrated in FIGURE 3 are registered with the open end defined between the flange sections 36' and 36" of the corresponding guide members 20 and 22. Thereafter, continued movement of the housing 16 to the right as viewed in FIGURE 3 of the drawings will cause the notched ends of the flanges 78 of the ways 70 disposed between the flange sections 36' and 36" to engage the cam surfaces or wedges 52 and 54 and the housing 16 to be cammed up onto the upper surfaces 84 of the flange sections 36". At this point, the housing 16 will be merely resting upon the upper surfaces 84 of the flange sections 36" and may therefore be readily lifted from the frame 18.

The center section 62, although illustrated and described as including a bottom, may be constructed without a bottom so as to merely form an insert which may be disposed between the bottom section 60 and the top section 64 for the purpose of providing one large compartment in which articles may be stored. Further, when the sections 60, 62 and 64 are secured together a good and relatively fluid-tight seal is formed between the abutting edges thereof thereby rendering the housing 16 watertight as far as rain is concerned and dustproof. Still further, the housing 16 may also be considered as mothproof in order that the housing 16 may be utilized as a storage receptacle for woolen clothes when the housing is not supported atop a vehicle.

The housing 16 may be constructed of any suitable material and the latch means 66, 68 and 66', 68' may be of the type provided with lock assemblies so as to prevent unauthorized entrance into the interior of the housing 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A car top carrier comprising a support frame defining generally parallel elongated guide means, a storage area defining housing, said housing including follower means guidingly engageable with said guide means for movement therealong and against movement laterally thereof, said guide means and said housing including first and second coacting means limiting movement of said housing in one direction along said guide means to a first fully mounted position thereon, said follower means being freely disengageable from said guide means upon movement of said housing in the opposite direction along said guide means to a second release position, and abutment means carried by said guide means and removably positionable behind a portion of said housing facing in said second direction, when said housing is in said first position, operative to prevent movement of said housing in said opposite direction to said second position, said guide means each being interrupted intermediate their opposite ends and defining a pair of elongated longitudinally aligned and spaced guide means sections, each of said follower means including a pair of followers releasably engaged with the corresponding pair of guide means sections and spaced longitudinally thereof, said guide means being generally horizontally aligned and the upper surfaces of the guide members disposed furthermost in said opposite direction defining runners along which the followers disposed furthermost in said one direction are adapted to slide after being moved in said opposite direction past said second release position, said guide members disposed furthermost in said opposite direction including cam surfaces engageable by said followers disposed furthermost in said one direction and operable to cam the last mentioned followers up onto said upper surfaces upon movement of said housing in said opposite direction past said second position.

2. The combination of claim 1 wherein said abutment means and said portion of said housing include coacting means operative to yieldingly urge said housing into its full limit position of movement in said one direction.

3. The combination of claim 2 wherein said first and second coacting means include cushion means defining a slightly yieldable limit of movement of said housing in said one direction.

4. A car top carrier comprising a support frame defining generally parallel elongated guide means, a storage area defining housing, said housing including follower means guidingly engageable with said guide means for movement therealong and against movement laterally thereof, said guide means and said housing including first and second coacting means limiting movement of said housing in one direction along said guide means to a first fully mounted position thereon, said follower means being freely disengageable from said guide means upon movement of said housing in the opposite direction along said guide means to a second release position, and abutment means carried by said guide means and removably positionable behind a portion of said housing facing in said second direction, when said housing is in said first position, operative to prevent movement of said housing in said opposite direction to said second position, said guide means including upstanding flanges from whose upper edge portions oppositely directed generally horizontal flanges project, said follower means including a pair of spaced apart and generally L-shaped followers dependingly supported from portions of the undersurface of said housing and including lower horizontal flange portions positionable beneath and interlockingly engaged with the horizontal flanges of the corresponding guide member for movement longitudinally thereof, said horizontal flanges being interrupted intermediate their opposite ends so as to define a pair of spaced flange sections, the horizontal flange portions of the followers disposed furthermost in said one direction being receivable between corresponding pairs of spaced flange sections, said flange sections being disposed furthermost in said opposite direction include downwardly inclined terminal ends on the ends thereof adjacent the flange sections disposed furthermost in said one direction defining ramps engageable by the followers disposed furthermost in said one direction upon movement of said housing from said first limit position to said second position and operable to cam the last mentioned followers upon the upper surfaces of the last mentioned flange sections upon movement of said housing in said opposite direction past said second position.

5. A car top carrier comprising a support frame defining generally parallel elongated guide means, a storage area defining housing, said housing including follower means guidingly engageable with said guide means for movement therealong and against movement laterally thereof, said guide means and said housing including first and second coacting means limiting movement of said housing in one direction along said guide means to a first fully mounted position thereon, said follower means being freely disengageable from said guide means upon movement of said housing in the opposite direction along said guide means to a second release position, said guide means including upstanding flanges, from whose upper edges portions oppositely directed generally horizontal flanges project, said follower means including a pair of spaced apart and generally L-shaped followers dependingly supported from portions of the undersurface of said housing and including lower horizontal flange portions positionable beneath and interlockingly engaged with the horizontal flanges of the corresponding guide member for movement longitudinally thereof, said horizontal flanges interrupted intermediate their opposite ends so as to define a pair of spaced flange sections, the horizontal flange portions of the followers disposed furthermost in said one direction being receivable between corresponding pairs of spaced flange sections, said flange sections being disposed furthermost in said opposite direction including downwardly inclined terminal ends on the ends thereof adjacent the flange sections disposed furthermost in said one direction defining ramps engageable by the followers disposed furthermost in said one direction upon movement of said housing from said first limit position to said second position and operable to cam the last mentioned followers upon the upper surfaces of the last mentioned flange sections upon movement of said housing in said opposite direction past said second position.

6. The combination of claim 5 wherein said support frame includes means adapting said frame for removable stationary securement to the top of a vehicle.

7. The combination of claim 6 wherein the last mentioned means includes means operative to support said guide means in elevated position above said vehicle top.

8. The combination of claim 5 wherein said support frame includes means adapting said frame for removable stationary securement to the top of the vehicle.

References Cited

UNITED STATES PATENTS

| | | | |
|---|---|---|---|
| 676,893 | 6/1901 | Hicks | 214—38 X |
| 3,167,193 | 1/1965 | Klosk | 214—83.26 |
| 1,693,607 | 12/1928 | Kellett | 214—38 |
| 2,506,421 | 5/1950 | Hacker et al. | |
| 2,746,627 | 5/1956 | White | 224—42.1 |
| 2,858,774 | 11/1958 | Batten | 214—38 X |
| 3,008,784 | 11/1961 | Allard | 224—42.1 X |

GERALD M. FORLENZA, *Primary Examiner.*

F. E. WERNER, *Assistant Examiner.*